United States Patent
Sasaki et al.

(10) Patent No.: US 6,190,761 B1
(45) Date of Patent: Feb. 20, 2001

(54) FRICTION MATERIAL

(75) Inventors: Yosuke Sasaki; Michinori Yanagi, both of Tokyo (JP)

(73) Assignee: Akebono Brake Industry Co. Ltd., Tokyo (JP)

( * ) Notice: Under 35 U.S.C. 154(b), the term of this patent shall be extended for 0 days.

(21) Appl. No.: 09/343,462

(22) Filed: Jun. 30, 1999

(30) Foreign Application Priority Data

| Jul. 1, 1998 | (JP) | ................................................ | 10-186331 |
| Oct. 22, 1998 | (JP) | ................................................ | 10-301247 |
| Jun. 25, 1999 | (JP) | ................................................ | 11-180391 |

(51) Int. Cl.⁷ .............................. B32B 5/02; B32B 27/16
(52) U.S. Cl. .................................... 428/301.4; 428/295.1; 428/299.1; 428/299.7; 428/301.1; 428/301.4
(58) Field of Search .............................. 428/295.1, 299.1, 428/299.7, 301.1, 301.4

(56) References Cited

U.S. PATENT DOCUMENTS 5,534,169 * 7/1996 Vicki .

FOREIGN PATENT DOCUMENTS 4-234479 8/1992 (JP) .

* cited by examiner

Primary Examiner—Richard Weisberger
(74) Attorney, Agent, or Firm—Finnegan, Henderson, Farabow, Garrett & Dunner, L.L.P.

(57) ABSTRACT

A friction material, including a fibrous reinforcement, a friction modifier, a lubricant and a binder, comprising a water-repellent fluoropolymer incorporated therein. The further incorporation of an alkaline metal salt makes it possible to render the matrix more hydrophilic and hence reduce creep noise. The foregoing fluoropolymer is one selected from the group consisting of ethylene tetrafluoride polymer, tetrafluoroethylene-hexafluoropropylene copolymer and polyvinylidene fluoride or a combination thereof.

15 Claims, 1 Drawing Sheet

FRICTION MATERIAL

BACKGROUND OF THE INVENTION

1. Field of the Invention

The present invention relates to a friction material for use in vehicle. More particularly, the present invention relates to a friction material for vehicle brakes which generate less brake noise, particularly less creep noise when an automatic car starts to run.

2. Description of the Related Art

As a friction material mainly for vehicle brakes or the like, there has been recently used one having a porosity from 10% to 30% for the purpose of improving fade resistance and enhancing effect at high velocity.

When a vehicle is operated in rainy weather or runs over puddles, the friction material gets wet with water. Further, when a vehicle is parked outside at night, the friction material can easily absorb water.

The friction material thus moistened generates a low frequency noise when the vehicle is braked and runs at velocity of not more than 5 km/h shortly before stopping while it is being dried. The friction material thus moistened also generates such a low frequency noise when an automatic car starts to run at a very low velocity, i.e., during the full release of the brake pedal which has been stepped after switching to D range, causing the brake to drag due to creep force. Such a low frequency noise is also called "creep noise". This noise offends the operator and thus makes a nuisance of the operator.

The greater the porosity of the friction material is, the more is the water absorption of the friction material and the greater is such a low frequency noise. Further, when the friction material is moistened, squeal is generated, or the friction coefficient is excessively raised, causing the generation of abnormal effect.

Claiming that a friction material which has been impregnated with a water repellent material so that is rendered water repellent can be prevented from forming an extremely thin water film thereon to inhibit a phenomenon called jada during clutch meet in respect to clutch facing, a dry friction material obtained by impregnating a friction material matrix made of organic fiber, inorganic fiber, metal wire, filler and binder with a water repellent material has been proposed (Japanese patent published unexamined application Hei. 4-234479).

According to the above cited application, the water repellent material to be used for this purpose is preferably a material which exhibits water repellency but doesn't impair friction characteristics, such as silicone oil and fluororesin.

The friction material which has thus been rendered water repellent can exert its desired effect on troubles as occurring when a vehicle is parked at night to cause the friction pad to get moistened. However, such a friction material generates greater creep noise when the vehicle starts to run with the rotor and friction pad being directly wet with water due to car washing or the like than friction materials which have not been rendered water repellent, bringing about a contrary effect.

SUMMARY OF THE INVENTION

An object of the present invention is to provide a friction material which generates less brake noise, particularly less creep noise when an automatic car starts to run.

The foregoing object of the present invention is accomplished with the following constitutions:

(1) A friction material made of a fibrous reinforcement, a friction modifier, a lubricant and a binder, comprising a water-repellent fluoropolymer incorporated therein.

(2) The friction material as defined in Clause (1), further comprising an alkaline metal salt incorporated therein.

(3) The friction material as defined in Clause (1) or (2), wherein said fluoropolymer is one selected from the group consisting of ethylene tetrafluoride polymer, tetrafluoroethylene-hexafluoropropylene copolymer and polyvinylidene fluoride or a combination thereof.

In accordance with the present invention, the use of the friction material having the foregoing structure makes it possible to effectively reduce creep noise not only when the friction pad is moistened after a prolonged parking at night (hereinafter simply referred to as "during moistening") but also when the friction pad gets wet with water during car washing (hereinafter simply referred to as "during wetting with water").

In the present invention, it was found that the scattering of a water-repellent fluoropolymer in a well known hydrophilic matrix makes it possible to exert an effect of reducing creep noise and the provision of the matrix with a better hydrophilicity developed by an alkaline metal salt makes it possible to further reduce creep noise.

Since the foregoing alkaline metal salt acts to render a friction material matrix hydrophilic, it may be added in powder form if added at the first stage of the procedure. Alternatively, since the alkaline metal salt is water-soluble, the friction material thermoformed may be impregnated with the alkaline metal salt in the form of aqueous solution.

EMBODIMENTS OF IMPLICATION OF THE INVENTION

Figure 1:
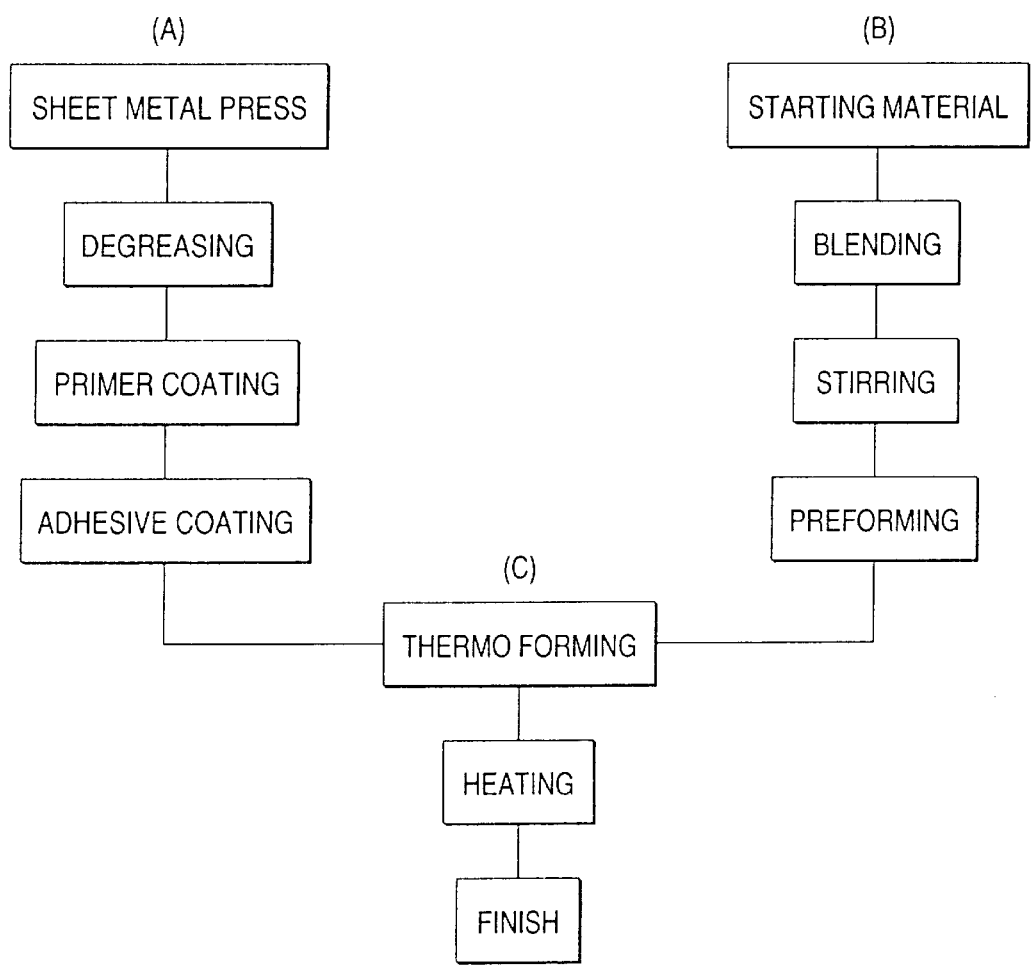
FIGURE 1 is a flow sheet illustrating an example of the process for the production of the friction material according to the present invention.

The friction material of the present invention can be produced by a process which comprises blending a friction material made of a fibrous reinforcement, a friction modifier, a lubricant and a binder with a water-repellent fluoropolymer, pre-forming the blend according to an ordinary method, and then thermoforming the blend.

As the foregoing water-repellent fluoropolymer there is preferably used one selected from the group consisting of ethylene tetrafluoride polymer, tetrafluoroethylene-hexafluoropropylene copolymer and polyvinylidene fluoride or a combination thereof. Other fluoropolymers may be also used. The water-repellent fluoropolymer is preferably in the form of powder so that it can be scattered in the matrix.

As the ethylene tetrafluoride polymer there may be used, Fluon Lubricant L169J or L170J, produced by Asahi Glass Co., Ltd.

Further, an alkaline metal salt may be previously incorporated in the friction material blend. Alternatively, the friction material blend which has been thermoformed may be impregnated with the alkaline metal salt in the form of aqueous solution.

Examples of the alkaline metal salt employable herein include sodium molybdate, sodium carbonate, lithium carbonate, and sodium borate.

The amount of the foregoing fluoropolymer to be incorporated is from 0.3 to 5 parts by weight, preferably from 0.5 to 5 parts by weight, based on 100 parts by weight of the friction material matrix. If the amount of the foregoing fluoropolymer to be incorporated falls below 0.3 parts by weight, the resulting effect is none. On the contrary, if the amount of the foregoing fluoropolymer to be incorporated exceeds 5 parts by weight, the resulting effect shows a deteriorated stability. The specific amount of the fluoropolymer to be incorporated can be varied, e.g., depending on the amount of the other components to be incorporated. It may be, e.g., 0.5 parts by weight, 1 part by weight, 3 parts by weight or the like.

The amount of the alkaline metal salt to be incorporated may be from 0.1 to 5 parts by weight, preferably from 0.2 to 5 parts by weight, based on 100 parts by weight of the friction material matrix. If the amount of the alkaline metal salt to be incorporated falls below 0.1 parts by weight, the resulting effect is none. On the contrary, if the amount of the alkaline metal salt to be incorporated exceeds 5 parts by weight, the resulting friction material exhibits excessive water absorption properties to cause the friction pad to expand, causing brake drag and noise. The specific amount of the alkaline metal salt to be incorporated can be varied, e.g., depending on the amount of the fluoropolymer to be incorporated. It may be 0.5 parts by weight, 1 part by weight, 3 parts by weight or the like.

The friction material may be, if possible, impregnated with the alkaline metal salt later, e.g., after the finishing step during the production of the friction material, in the form of aqueous solution. The impregnation may be effected before the finishing step.

The impregnation of the friction material with the alkaline meal salt can be accomplished by vacuum impregnation, coating or dipping. Preferred among these methods is vacuum impregnation from the standpoint of the efficiency of impregnation of the interior of the friction material.

The friction material which has thus been impregnated with the alkaline metal salt is then dried at a temperature of 110° C. for 1 hour.

FIGURE 1 illustrates a process for the production of a friction pad for disc brake. In the same manner as in the conventional process, a pressure plate, obtained by a process which comprises subjecting a metal to sheet working into a predetermined shape, subjecting the sheet to degreasing and primer coating, and then coating the sheet with an adhesive, and a preform at room temperature under a predetermined pressure, obtained by a process which comprises forming (preforming) a starting material, which includes fibrous reinforcement such as heat-resistant organic fiber, inorganic fiber, metal fiber etc. and powder material such as inorganic filler, organic filler, thermosetting resin binder etc., has been thoroughly stirred so that it is homogenized, were together thermoformed at a predetermined temperature under a predetermined pressure at the thermoforming step so that the two members are fused to each other, after-cured, and then finally finished.

As the foregoing heat-resistant organic fiber there may be used an aromatic polyamide fiber or flame-resistant acrylic fiber. Examples of the inorganic fiber employable herein include ceramics fiber such as potassium titanate fiber and alumina fiber, glass fiber, carbon fiber, and rock wool. As a metal fiber there may be used copper fiber or steel fiber.

Examples of an inorganic filler employable herein include particulate metal such as copper powder, aluminum powder and zinc powder, scaly inorganic material such as vermiculite and mica, and particulate material such as barium sulfate powder and calcium carbonate powder. Examples of an organic filler employable herein include synthetic rubber and cashew resin.

Examples of a thermosetting resin binder employable herein include phenolic resin (including straight phenolic resin and various modified phenolic resins modified with rubber, etc.), melamine resin, epoxy resin, and cyanic acid ester resin.

As the friction modifier employable herein there may be used a metal oxide such as alumina, silica, magnesia, zirconia, chromium oxide and quartz. As the solid lubricant employable herein there may be used graphite, molybdenum disulfide or the like.

The present invention will be further described in the following examples, but the present invention should not be construed as being limited thereto.

EXAMPLE (Example of formulation of friction material as matrix)

| Phenolic resin | 25 vol % |
|---|---|
| Aramide pulp | 10 vol % |
| Friction modifier | 47 vol % |
| | (cashew resin dust, titanium, magnesia) |
| Lubricant | 18 vol % |
| | (graphite, molybdenum disulfide) |

(Preparation of samples of examples and comparative examples)

100 parts by weight of the foregoing friction material matrix were blended with the following components, respectively. The blends were each then processed in accordance with ordinary method to prepare pads of Examples 1 to 12 and Comparative Examples 1 to 4, respectively.

| (1) | Ethylene tetrafluoride powder | 0 parts by weight |
|---|---|---|
| (2) | " | 0.5 parts by weight |
| (3) | " | 1 part by weight |
| (4) | " | 3 parts by weight |
| (5) | Sodium molybdate powder | 0 parts by weight |
| (6) | " | 0.5 parts by weight |
| (7) | " | 1 part by weight |
| (8) | " | 3 parts by weight |

These samples were prepared by combining the foregoing components.

Note) 1. Preliminary experiments revealed that if the amount of ethylene tetrafluoride powder to be incorporated exceeds 5 parts by weight, the resulting effect shows a deteriorated stability. Thus, the ethylene tetrafluoride powder was incorporated in an amount falling within the above defined range.

2. Preliminary experiments revealed that if the amount of the sodium molybdate powder to be incorporated exceeds 5 parts by weight, the resulting friction material exhibits excessive water absorption properties to cause the friction pad to expand, causing brake drag and noise. Thus, the sodium molybdate powder was incorporated in an amount falling within the above defined range.

(Testing Method)

Vehicles equipped with a brand-new rotor and a disc brake comprising the foregoing friction pad samples were each braked to stop at initial velocity of 50 km/h every 1 km over 200 km. When the friction pad and the rotor were thus brought into sufficient sliding contact with each other, the following tests were conducted.

(1) Test at Moistening

The vehicle was allowed to stand in a chamber at room temperature (20° C.) and a humidity of 95% (humidity at which creep noise can be easily generated) for 12 hours, braked with a deceleration degree of 0.2 G at a velocity of 20 km/h, and then organoleptically examined for creep noise.

(2) Test at Water Leakage

The rotor and the friction pad were twice sprayed with water at a rate of 10 per minute for 1 minute each for right and left wheels. The vehicle was braked with a deceleration degree of 0.2 G at a velocity of 20 km/h, and then organoleptically examined for creep noise.

(Results of Test)

The results of these tests are set forth in Table 1.

TABLE 1

| Parts by weight | Sodium molybdate | | | |
|---|---|---|---|---|
| | 0 | 0.5 | 1 | 3 |
| Ethylene tetrafluoride polymer powder | | | | |
| 0 | Comparative Example 1 high/high | Comparative Example 2 middle/low | Comparative Example 3 low/very low | Comparative Example 4 low/very low |
| 0.5 | Example 1 very low/low | Example 2 very low/very low | Example 3 very low/very low | Example 4 none/none |
| 1 | Example 5 very low/low | Example 6 very low/very low | Example 7 none/very low | Example 8 none/none |
| 3 | Example 9 very low/low | Example 10 none/very low | Example 11 none/very low | Example 12 none/none |

The horizontal column indicates the added amount of sodium molybdate while the vertical column indicates the added amount of ethylene tetrafluoride polymer (by weight).

In Table 1, the term "middle/low", for example, indicates that the level of creep noise at moistening is middle and the level of creep noise at wetting with water is low.

The highest level out of 10 test results is set forth in Table 1.

The "very low" level at moistening is accepted. The "small" level at wetting with water is accepted.

In the foregoing examples, a conventional process was employed. However, a friction pad obtained by blending a friction material matrix with a fluoropolymer powder, and then thermoforming the blend may be impregnated with an aqueous solution of an alkaline metal salt powder. In accordance with this process, the alkaline metal salt can be dispersed in the friction material blend more uniformly than in these examples.

Examples 13–16

Friction pads were prepared in the same manner as in Example 1 or Example 5 except that the friction material matrix was blended with a tetrafluoroethylene-hexafluoropropylene copolymer (FEP) or polyvinylidene fluoride (PVd) instead of ethylene tetrafluoride polymer in an amount of 0.5 parts by weight or 1.3 parts by weight, respectively. These friction pads were examined in the same manner as mentioned above. The results were similar to that of Examples 1 and 5.

In accordance with the present invention, possible creep noise can be effectively reduced not only when the friction pad is moistened after a prolonged parking at night but also when the rotor and the friction pad gets wet with water during car washing.

Further, the alkaline metal salt to be used for this purpose can be easily incorporated in the friction material matrix in the form of powder during the production of friction material. Alternatively, the friction material matrix may be impregnated with the alkaline metal salt in the form of aqueous solution so that the alkaline metal salt can be incorporated therein more uniformly.

What is claimed is:

1. A friction material comprising:
   a base matrix wherein said base matrix comprises a fibrous reinforcement, a friction modifier, a lubricant, and a binder; and
   a water-repellent fluoropolymer, wherein said friction material is a solid.

2. The friction material according to claim 1, further comprising an alkaline metal salt incorporated therein.

3. The friction material according to claim 1, wherein said fluoropolymer is one selected from the group consisting of ethylene tetrafluoride polymer, tetrafluoroethylene-hexafluoropropylene copolymer and polyvinylidene fluoride or a combination thereof.

4. The friction material according to claim 2, wherein said fluoropolymer is one selected from the group consisting of ethylene tetrafluoride polymer, tetrafluoroethylene-hexafluoropropylene copolymer and polyvinylidene fluoride or a combination thereof.

5. The friction material according to claim 1, wherein the amount of said fluoropolymer to be incorporated is from 0.5 to 5 parts by weight based on 100 parts by weight of said matrix.

6. The friction material according to claim 2, wherein the amount of said fluoropolymer to be incorporated is from 0.5 to 5 parts by weight based on 100 parts by weight of said matrix.

7. The friction material according to claim 3, wherein the amount of said fluoropolymer to be incorporated is from 0.5 to 5 parts by weight based on 100 parts by weight of said base matrix.

8. The friction material according to claim 4, wherein the amount of said fluoropolymer to be incorporated is from 0.5 to 5 parts by weight based on 100 parts by weight of said base matrix.

9. The friction material according to claim 2, wherein said alkaline metal salt is one selected from the group consisting of sodium molybdate, sodium carbonate, lithium carbonate and sodium borate.

10. The friction material according to claim 6, wherein said alkaline metal salt is one selected from the group consisting of sodium molybdate, sodium carbonate, lithium carbonate and sodium borate.

11. The friction material according to claim 8, wherein said alkaline metal salt is one selected from the group consisting of sodium molybdate, sodium carbonate, lithium carbonate and sodium borate.

12. The friction material according to claim 2, wherein the amount of said alkaline metal salt to be incorporated is from 0.2 to 5 parts by weight based on 100 parts by weight of said matrix.

13. The friction material according to claim 9, wherein the amount of said alkaline metal salt to be incorporated is from 0.2 to 5 parts by weight based on 100 parts by weight of said base matrix.

14. The friction material according to claim 10, wherein the amount of said alkaline metal salt to be incorporated is from 0.2 to 5 parts by weight based on 100 parts by weight of said base matrix.

15. The friction material according to claim 11, wherein the amount of said alkaline metal salt to be incorporated is from 0.2 to 5 parts by weight based on 100 parts by weight of said base matrix.

* * * * *

UNITED STATES PATENT AND TRADEMARK OFFICE
CERTIFICATE OF CORRECTION

PATENT NO. : 6,190,761 B1
DATED : February 20, 2001
INVENTOR(S) : Yosuke Sasaki et al.

Page 1 of 1

It is certified that error appears in the above-identified patent and that said Letters Patent is hereby corrected as shown below:

Column 6,
Lines 53 and 57, before "matrix", insert -- base --.

Column 7,
Line 14, before "matrix,", insert -- base --.

Signed and Sealed this

Twenty-fifth Day of June, 2002

*Attest:*

*Attesting Officer*

JAMES E. ROGAN
*Director of the United States Patent and Trademark Office*